United States Patent
Matsunaga

(10) Patent No.: US 6,953,283 B2
(45) Date of Patent: Oct. 11, 2005

(54) FOIL BEARING

(75) Inventor: Minoru Matsunaga, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 169 days.

(21) Appl. No.: 10/644,724

(22) Filed: Aug. 21, 2003

(65) Prior Publication Data

US 2004/0042691 A1 Mar. 4, 2004

(30) Foreign Application Priority Data

Aug. 28, 2002 (JP) .......................................... 2002-249126

(51) Int. Cl.$^7$ ............................................. F16C 17/03
(52) U.S. Cl. ...................................... 384/103; 384/105
(58) Field of Search ................................. 384/103, 105, 384/104, 106

(56) References Cited

U.S. PATENT DOCUMENTS 3,893,733 A 7/1975 Silver et al.
4,178,046 A 12/1979 Silver et al.
4,445,792 A 5/1984 Trippett Primary Examiner—Lenard A. Footland
(74) Attorney, Agent, or Firm—Squire, Sanders & Dempsey LLP

(57) ABSTRACT

In a foil bearing (23) having a plurality of foils (26) disposed in a gap between a rotating member (12) and a stationary mount member (25), a moveable member (27) is disposed on a side of the stationary member opposite to the rotating member so as to be rotatable with respect to the stationary mount member, abutting members (30) extend from the moveable member toward the associated foils through respective through-holes formed in the stationary mount member, and a surface of the moveable member with which one end of each abutting member is in contact is provided with a cam surface. In such a structure, by rotating the moveable member and thus changing the length of the abutting members projecting out from the surface of the stationary mount member, it is possible to vary the range of movement of the foils and practically vary the stiffness of the same.

12 Claims, 10 Drawing Sheets

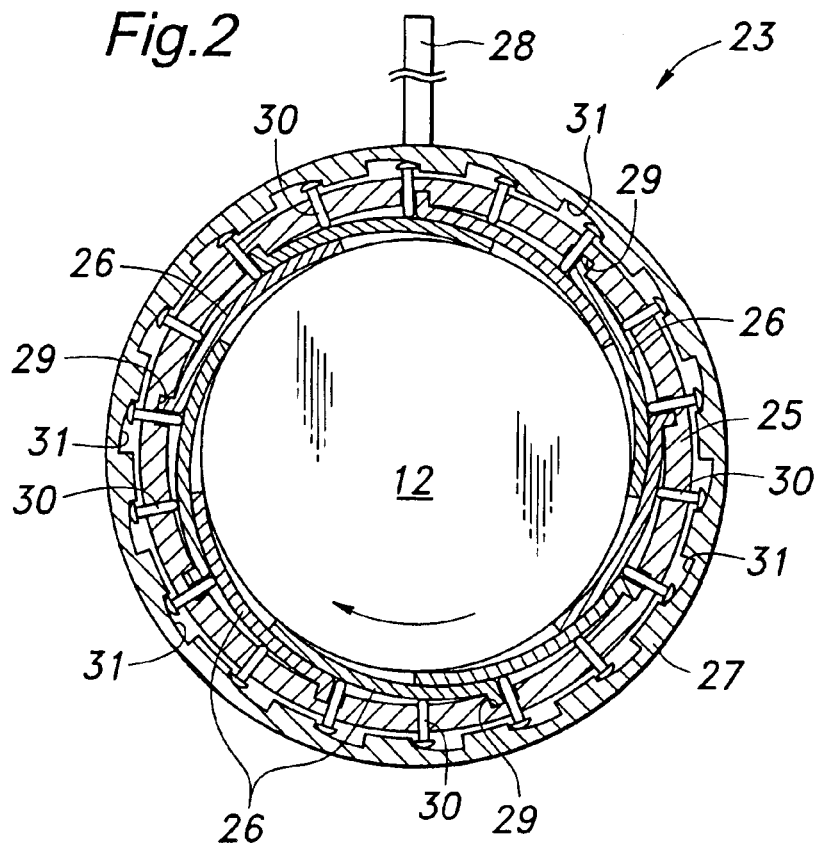
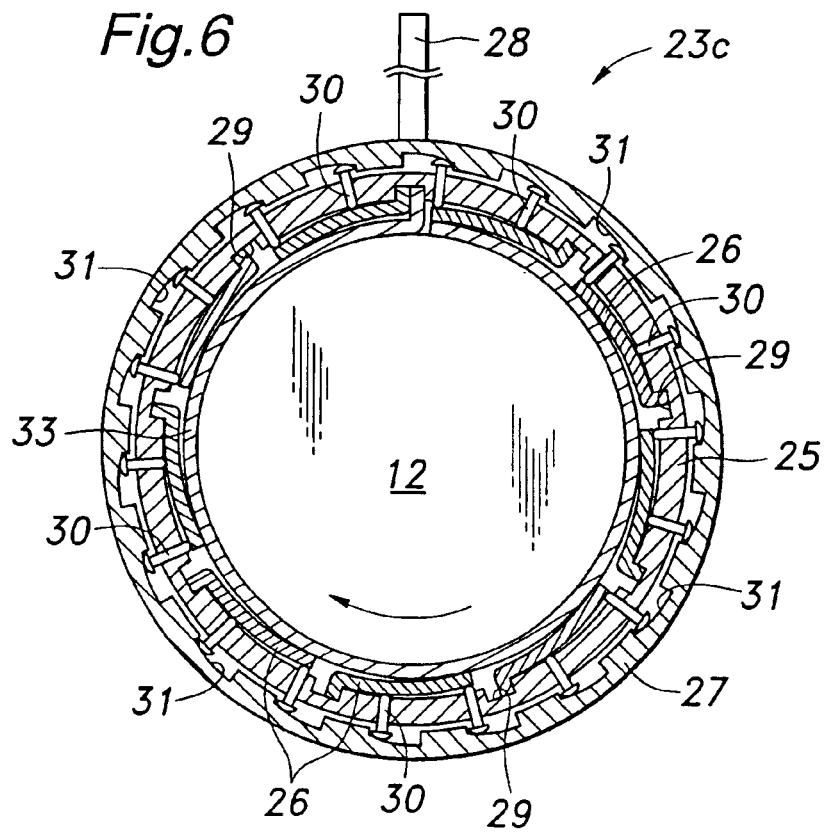

FOIL BEARING

TECHNICAL FIELD

The present invention relates to foil bearings. Particularly, the present invention relates to foil bearings suitable for use as a journal bearing or thrust bearing for a rotor shaft of a micro gas turbine generator.

BACKGROUND OF THE INVENTION

It has been conventionally known to use a foil bearing as a bearing for a rotor shaft. A foil bearing typically comprises a housing surrounding the rotor shaft and a plurality of foils disposed in a space or gap between the rotor shaft and the housing and arranged in a circumferential direction in such a manner that each of the foils is attached to the housing in a cantilever fashion with its free end being urged toward the rotor shaft. As the rotor shaft rotates, a fluid such as ambient air is drawn in between the rotor shaft and the foils, creating a fluid film between an outer surface of the rotor shaft and the foils to allow the rotor shaft to rotate with low friction. Such a foil bearing that supports a load of the rotor shaft via the fluid film formed as a result of the rotor shaft rotation may be called a hydrodynamic foil bearing.

In the foil bearing as described above, characteristics of the fluid film formed between the rotor shaft and the foils may vary between a state where the rotor shaft rotation speed is low, e.g., at the start up or shut down, and a state where the rotor shaft rotation speed is high. Thus, in order to achieve a stable rotation in both states, it is desired that a preload of the foils against the rotor shaft is adjustable according to the rotation speed of the rotor shaft.

U.S. Pat. No. 4,445,792 issued to Trippett has disclosed a foil bearing in that the preload of the foils can be adjusted. The foil bearing has a housing surrounding the rotor shaft, and a plurality of foil mounts arranged along the circumferential surface of the rotor shaft and rotatably supported relative to the housing, wherein each mount has a foil attached thereto to cantilever the foils and has a driven portion. Further, a drive mechanism (ring gear) rotatable relative to the housing is provided outside the housing so as to be engageable with the driven portions of the foil mounts to simultaneously rotate the mounts and vary the preload of the foils against the shaft surface.

In such a foil bearing, however, the preload of the foils against the rotor shaft relies upon an elasticity of each foil, and thus it is difficult to vary the preload in a sufficiently large range, and further, an excessive force tends to concentrate on a root portion of each cantilevered foil.

Other known prior art may include U.S. Pat. No. 3,893,733 issued to Silver et al, which has disclosed to use foil supports that slidingly contact the foils to increase the stiffness (or rigidity) of the foils. U.S. Pat. No. 4,178,046 issued to Silver et al has disclosed a foil bearing in that each foil is mounted intermediate the ends thereof.

BRIEF SUMMARY OF THE INVENTION

In view of such problems of the prior art, a primary object of the present invention is to provide a foil bearing that can allow stiffness or preload of foils against a rotating member, such as a rotor shaft, to be varied in a wide range to ensure stable rotation of the rotating member at both low and high rotation speed regions, while avoiding an excessive force applied on a part of each foil.

A second object of the present invention is to provide such a foil bearing simple in structure and low at cost.

According to the present invention, such objects can be accomplished by providing a foil bearing for supporting a rotating member that rotates about an axis, comprising: a stationary mount member spaced from the rotating member so that a gap is defined between the stationary mount member and the rotating member, the stationary mount member having a first surface facing the rotating member and a second surface opposite to the first surface; a moveable member disposed on a side of the stationary mount member opposite to the rotating member so as to be rotatable about the axis, the moveable member having a first surface facing the second surface of the stationary mount member; a first foil disposed in the gap between the rotating member and the stationary mount member to support the rotating member via a fluid film when the rotating member rotates, the first foil having a portion extending in a substantially circumferential direction; and an abutting member extending from the moveable member toward the first foil through a through-hole formed in the stationary mount member, the abutting member having one end in contact with the first surface of the moveable member and other end facing the circumferentially extending portion of the first foil, wherein a cam surface is formed on a part of the first surface of the moveable member with which the one end of the abutting member is in contact so that rotation of the moveable member around the axis can vary a length of the other end portion of the abutting member projecting out from the first surface of the stationary mount member toward the circumferentially extending portion of the first foil.

Thus, because the abutting member is provided so as to extend from the moveable member toward the circumferentially extending portion of the foil through the through-hole formed in the stationary mount member and the surface of the moveable member contacting the one end of the abutting member is provided with a cam surface, rotation of the moveable member can vary the length of the other end portion of the abutting member projecting out from the surface of the stationary mount member toward the foil. Therefore, by varying the angular position of the moveable member, it is possible to adjust a position at which the abutting member abuts the circumferentially extending portion of the foil when an externally applied force causes the foil to flex outwardly (or away from the rotating member). This has substantially the same effect as varying the stiffness of the foil. In a case where the present invention is applied to a journal bearing and/or thrust bearing of a gas turbine engine, for example, the angular position of the moveable member may be controlled according to the rotational speed of the gas turbine engine so that an appropriate stiffness (or range of movement) is provided to the foil and a preferable bearing property is achieved for a wide range from low to high rotational speed regions. The abutting member limits the flexing movement of the associated foil by abutting the circumferentially extending portion thereof, and thus it is possible to prevent an excessive force from being concentrated on the root portion of the foil.

When the foil bearing comprises a plurality of the first foils arranged in the circumferential direction of the rotating member, at least one of the plurality of first foils may be allotted with the abutting member. In the case that a rotor shaft is used as the rotating member, for example, only the first foil(s) disposed on a lower side of the rotor shaft and thus supporting the weight of the rotor shaft may be allotted with the abutting member(s). It is also possible that each of the plurality of first foils is allotted with the abutting member. The number of abutting members allotted to individual first foils may be varied from one foil to another.

When the foil bearing comprises a plurality of the abutting members, the abutting members may have varying lengths. For example, in the case that a pair of abutting members spaced in the circumferential direction are allotted to each foil, the pair of abutting members may have different lengths according to the positions thereof so that the pair of abutting members can simultaneously abut the associated foil. Alternatively or additionally, abutting members associated with different foils may have varying lengths. For example, in the case that a rotor shaft is used as the rotating member, the abutting member(s) allotted to the first foil(s) disposed on the lower side of the rotor shaft may have a longer length than the abutting member(s) allotted to the first foil(s) disposed on the upper side of the rotor shaft, whereby imparting a higher stiffness to the first foils disposed on the lower side of the rotor shaft than to the first foils disposed on the upper side of the same to compensate the effects of the weight of the rotor shaft. Alternatively or additionally, a plurality of cam surfaces corresponding to the plurality of abutting members may have varying levels. Further, spaces between adjacent ones of the plurality of first foils may be varied.

In one embodiment of the present invention, the rotating member comprises a shaft having a substantially cylindrical portion, and the stationary mount member surrounds the shaft so that the gap is formed as an annular gap defined between a cylindrical surface of the cylindrical portion of the shaft and the stationary mount member. In such a case, if the shaft consists of a rotor shaft of a gas turbine engine, the foil bearing can constitute a journal bearing for the rotor shaft of the gas turbine engine.

When the foil bearing comprises a plurality of the first foils arranged in the circumferential direction of the shaft serving as the rotating member, a second foil (top foil) may be disposed between the shaft and the plurality of first foils such that the second foil extends in the circumferential direction to have a substantially cylindrical shape.

In another embodiment of the preset invention, there is provided a foil bearing for supporting a rotating member that rotates about an axis, comprising: a stationary mount member surrounding the rotating member so that a gap is defined between the stationary mount member and the rotating member, the stationary mount member having an inner circumferential surface facing the rotating member and an outer circumferential surface opposite to the inner circumferential surface; and a top foil disposed in the gap between the rotating member and the stationary mount member to support the rotating member via a fluid film when the rotating member rotates, the top foil consisting of a member extending in a circumferential direction to have a substantially cylindrical shape, wherein one end of the top foil is secured to the stationary mount member while the other end of the top foil extends in a radial direction through a slot formed in the stationary mount member at a position near the one end of the top foil to project out from the outer circumferential surface of the stationary mount member, and wherein the foil bearing further comprises an abutting member which is moveably attached to the stationary member so as to abut a side of the radially extending portion of the other end of the top foil facing away from the one end of the top foil whereby stiffness of the top foil can be practically adjusted by varying a position at which the abutting member abuts the radially extending portion of the top foil. In such an embodiment also, when embodying a journal bearing of a gas turbine engine, for example, the position of the moveable member and hence the stiffness of the top foil may be controlled according to the rotational speed of the gas turbine engine so that a preferable bearing property is achieved for a wide range from low to high rotational speed regions.

In yet another embodiment of the present invention, the rotating member may comprise a disk-shaped member and the gap may be defined between the stationary mount member and a planar surface of the disk-shaped member. In such a case, if the disk-shaped member is provided as a unitary portion of a rotor shaft of a gas turbine engine, the foil bearing can constitute a thrust bearing of the rotor shaft of the gas turbine engine.

Other and further objects, features and advantages of the invention will appear more fully from the following description.

BRIEF DESCRIPTION OF THE DRAWINGS

Now the present invention is described in the following with reference to the appended drawings, in which:

FIG. 2 is a cross sectional view taken along the lines II—II in FIG. 1;

FIG. 6 is a cross sectional view similar to FIG. 2 and shows yet another embodiment of a foil bearing to which the present invention is applied;

DETAILED DESCRIPTION OF THE PREFERRED EMBODIMENTS

Figure 1:
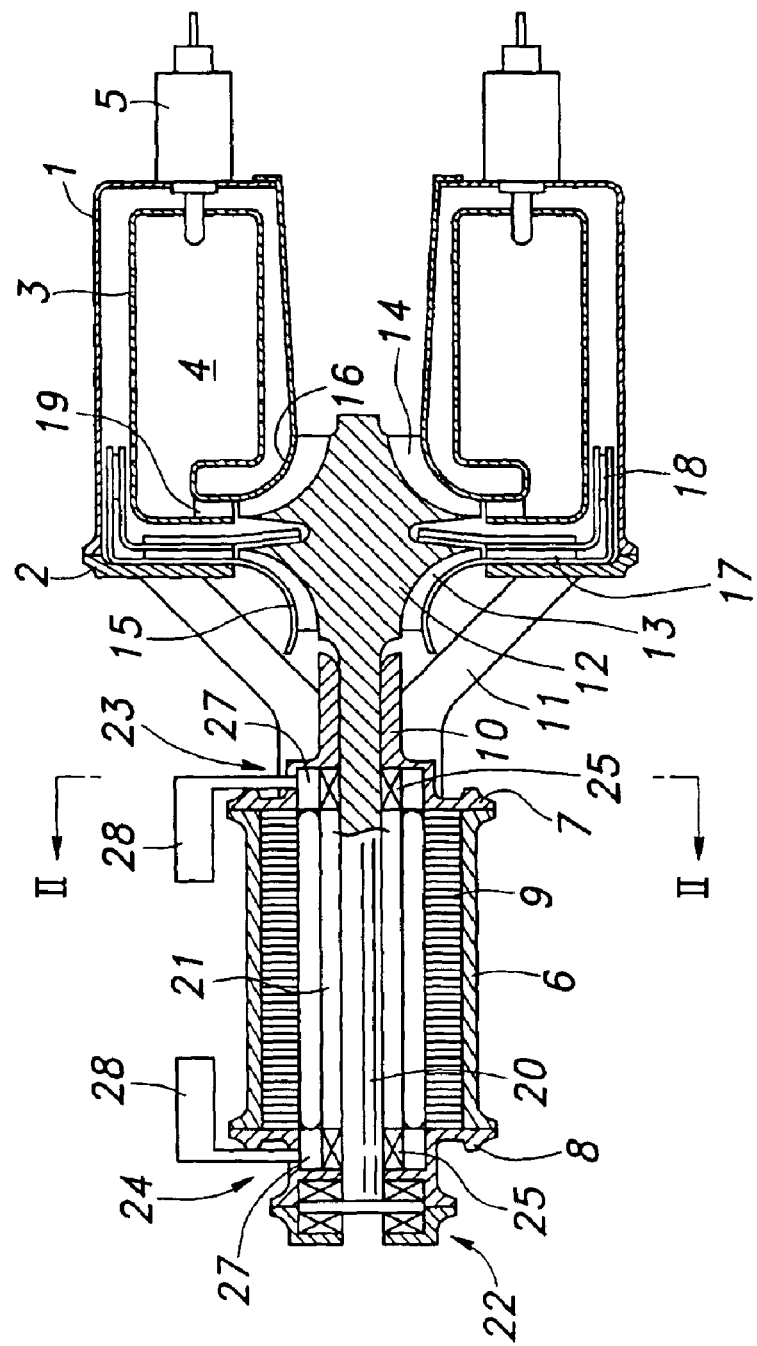
FIG. 1 is a longitudinal cross sectional view for showing an embodiment of a gas turbine generator to which the present invention is applied.

FIG. 1 is a longitudinal cross sectional view for showing a micro gas turbine generator to which the present invention is applied. The micro gas turbine generator includes a gas turbine engine as a power source and an electric generator driven by the gas turbine engine. The gas turbine engine comprises an annular main housing 1 of which end remote from the generator is closed, an end plate 2 attached to an open end of the main housing 1, a perforated annular inner housing 3 coaxially received inside the main housing 1 to define a combustion chamber 4 therein, and a plurality of fuel injectors 5 each having a nozzle end projecting into the combustion chamber 4.

The generator comprises a cylindrical main housing 6 and a pair of end plates 7 and 8 attached to either axial end of the main housing 6. The main housing 6 coaxially receives a stator coil 9 therein. The end plate 7 facing the gas turbine engine is provided with a tubular extension 10 extending centrally from the end plate 7 toward the gas turbine engine. Also, the end plate 7 facing the gas turbine engine is joined to the opposite end plate 2 of the gas turbine engine by a plurality of stay members 11.

The gas turbine engine is additionally provided with an integral rotor shaft 12 carrying a compressor wheel 13 and a turbine wheel 14. The compressor wheel 13 and turbine wheel 14 are composed of a plurality of compressor blades and turbine blades, respectively. The integral rotor shaft 12 of this embodiment is made of ceramic material, and is integrally formed with the compressor wheel 13 and turbine wheel 14 as a single-piece ceramic rotor assembly. Alternatively, the rotor shaft 12 may be implemented as an assembly comprising a plurality of individual component parts which may be made of a same material or different materials. The material for the turbine blades should be ceramic or other heat resistant material which may be either electroconductive or electrically insulating, and the choice of the material or materials depends on the particular configuration and specifications of the gas turbine engine. The axial length of this micro gas turbine engine is approximately 10 cm.

The compressor wheel 13 forms a radial compressor section in cooperation with a shroud 15 formed by a part of the end plate 2 attached to the gas turbine main housing 1. The inlet end of the compressor section opens out in the axial direction to face the generator. The outlet end of the compressor section communicates with a gap defined between the main housing 1 and the inner housing 3 via a diffuser 17 and an array of stator vanes 18 arranged in a circumferential direction.

The turbine wheel 14 forms a radial turbine section in cooperation with a turbine casing 16 formed by a part of the main housing 1. The inlet end of the turbine section communicates with an outlet end of the combustion chamber 4 via an inlet nozzle 19. The combustion chamber 4 in this embodiment extends from the inlet end of the turbine section in a direction away from the generator. The outlet end of the turbine section opens out in the axial direction facing away from the generator.

The integral rotor shaft 12 further comprises a generator shaft 20 which is an integral extension of the rotor shaft 12, and is passed centrally through the generator. Permanent magnet pieces 21 are mounted to the generator shaft 20 to form the main functional part of the generator in cooperation with the stator coil 9.

A thrust bearing 22 is provided at the end portion of the rotor shaft 12. Further, a pair of journal bearings 23, 24 according to the present invention are provided in the end plates 7, 8 to rotatably support the rotor shaft 12 at two points.

FIG. 2 is a cross sectional view taken along the lines II—II in FIG. 1 and shows the journal bearing 23 in detail. It should be noted that in FIG. 2, the end plate 7 is omitted for clarity and the journal bearing 24 may have the same structure as the journal bearing 23. The journal bearing 23 comprises an annular stationary mount member 25 which surrounds the rotor shaft 12 (or generator shaft 20) serving as a rotating member such that a gap is defined between an inner surface of the mount member 25 and an outer surface of the rotor shaft 12, a plurality of foils 26 serving as first foils disposed in the gap between the rotor shaft 12 and the stationary mount member 25, an annular moveable member 27 surrounding the stationary mount member 25 and rotatable with respect to the stationary mount member 25 around an axis of the rotor shaft 12, and an operation bar 28 attached to the moveable member 27 for rotational operation therefor. The stationary mount member 25 is unrotatably secured to the end plate 7 by a suitable means. The operation bar 28 extends in a radial direction through a slit formed in the end plate 7 and can be controlled by a suitable control means not shown in the drawings in accordance with the rotational speed of the gas turbine engine, for example.

Each foil 26 is made of a flexible material such as a metal, and has one end received in a corresponding one of recesses 29 formed in an inner circumferential surface of the stationary mount member 25 so that the end is fixedly attached to the mount member 25. Each of the foils 26 is bent at a part near the attachment so that a main portion thereof extends in a circumferential direction substantially along the outer surface of the rotor shaft 12. In the embodiment shown in this drawing, a part of one foil 26 overlaps a part of a circumferentially neighboring foil 26, but in another embodiment each foil 26 may not overlap its neighboring foil 26. The foils 26 thus bent are urged toward the rotor shaft 12 due to their own elasticity. In the foil bearing constructed as above, as the rotor shaft 12 rotates in a direction indicated by an arrow in FIG. 2, a fluid such as ambient air is drawn between the rotor shaft 12 and the foils 26 whereby the rotor shaft 12 is supported with low friction.

Figure 3A:
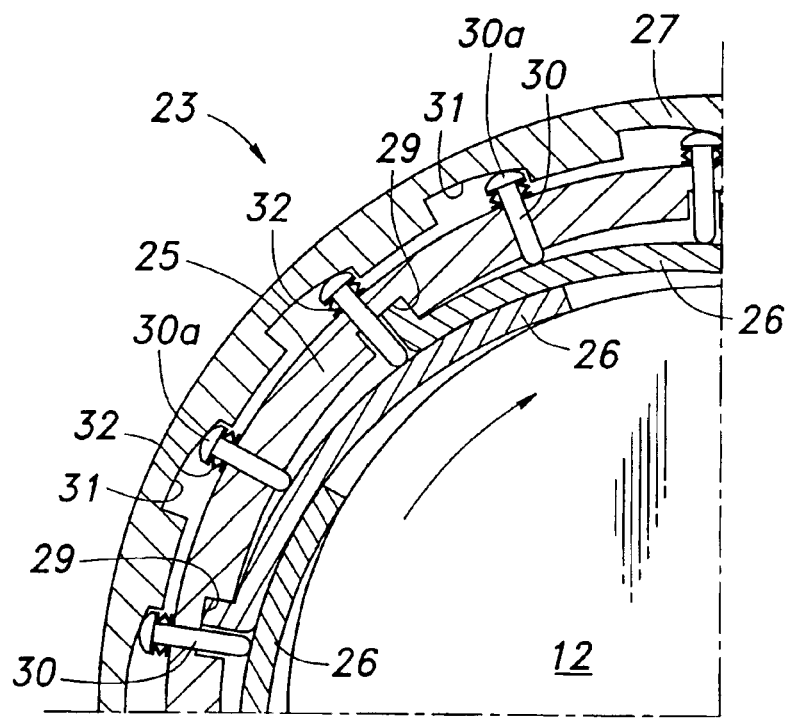
FIGS. 3a and 3b are enlarged cross sectional views for showing a preferred embodiment of a foil bearing according to the present invention in detail, in which a moveable member is shown at different angular position.
Figure 3B:
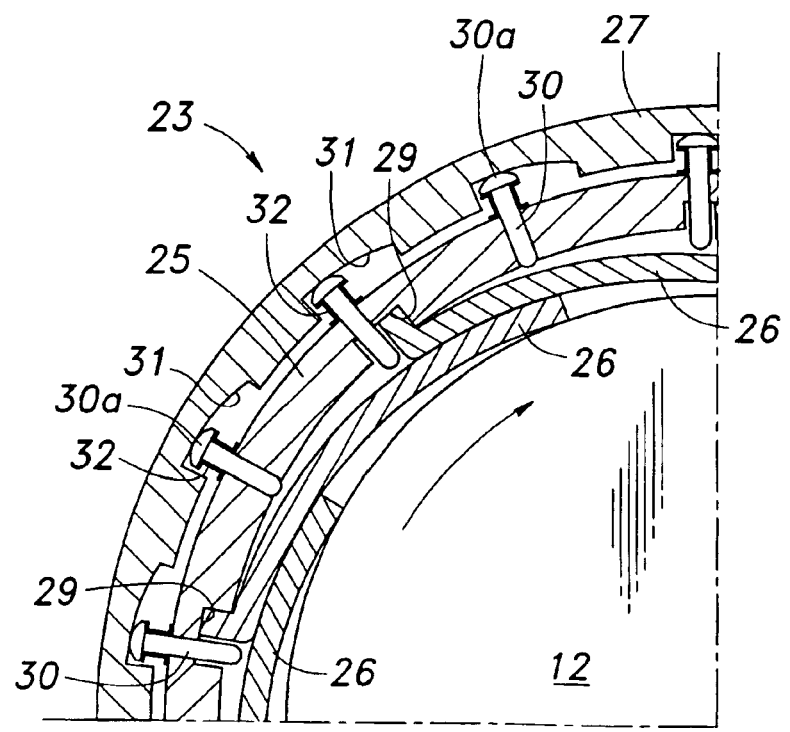

FIGS. 3a and 3b are enlarged partial views of FIG. 2 and show a detailed structure of the journal bearing 23 according to the present invention. As shown in the drawings, in this embodiment, a plurality of abutting members 30 extend radially through respective through-holes formed in the stationary mount member 25. One end of each abutting member 30 is received in an associated one of recesses 31 provided in an inner circumferential surface of the moveable member 27, and the other end thereof projects from an inner circumferential surface of the stationary mount member 25 to face a circumferentially extending portion of the associated foil 26. The one end of each abutting member 30 is formed with a flange 30a, and an annular compression spring 32 is disposed between the flange 30a and an outer circumferential surface of the stationary mount member 25 so that the abutting member 30 is prevented from undesirably moving out of place and is urged toward the recess 31 of the moveable member 27. The compression spring 32 may consist of any suitable resilient member. Each of the recesses 31 formed in the moveable member 27 has a depth that varies in the circumferential direction so that the bottom surface of the recess 31 serves as a cam surface contacting the one end of the abutting member 30.

Figure 4A:
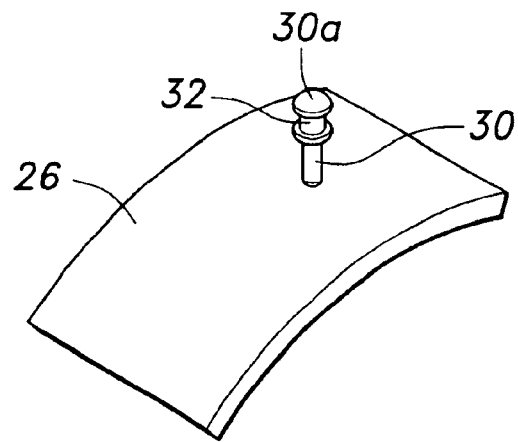
FIGS. 4a–4c are perspective views showing various embodiments of the abutting member(s) together with a circumferentially extending portion of the foil shown in FIGS. 3a and 3b.
Figure 4B:
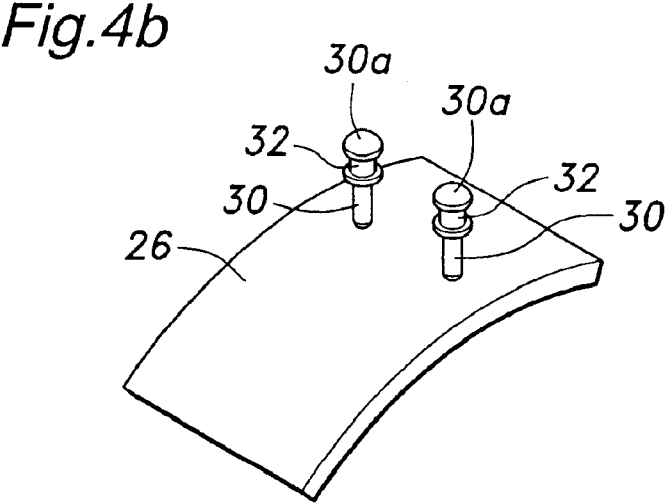
Figure 4C:
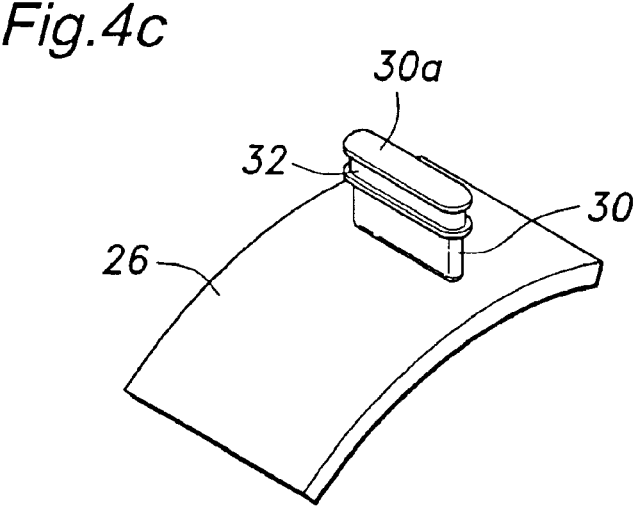

FIGS. 4a–4c are perspective views showing examples of the abutting member 30 together with the circumferentially extending portion of the foil 26. In FIG. 4a, one rod-shaped abutting member 30 is used for a single foil 26. In FIG. 4b, a pair of abutting members 30 are juxtaposed in a widthwise direction of the foil 26 to prevent distortion of the foil 26. In FIG. 4c, for the same purpose, the abutting member 30 consists of a plate-shaped member extending in the widthwise direction of the foil 26. Thus, the shape of the abutting member 30 and/or the number of the abutting member 30 allocated to each foil 26 may be varied arbitrarily according to various factors such as the thickness, length or material of the foils 26, etc.

In a state shown in FIG. 3a, the one end of each abutting member 30 contacts a shallow portion of the corresponding recess 31 formed in the moveable member 27, and accordingly the abutting member 30 is pushed out toward the foil 26 against the force exerted by the compression spring 32 so that the other end of the abutting member 30 projects out from the inner circumferential surface of the stationary mount member 25. Thus, when the foils 26 are urged outwardly by the weight of the rotor shaft 12 and/or by the rotation of the rotor shaft 12 causing the fluid to be drawn in between the rotor shaft 12 and the foils 26, the abutting members 30 abut the associated foils 26 to limit the flexing movement of the foils 26. This reduces the range of movement of the foils 26 and is practically equivalent to increasing the stiffness of each foil 26. As seen in the drawings, in this embodiment, a pair of circumferentially spaced abutting members 30 are provided for each foil 26 in such a manner that one of the pair of abutting members 30 closer to the root portion of the foil 26 is shorter than the other of the pair of abutting members 30. Thus, although each foil 26 is slightly curved so that a free end portion thereof is positioned at a greater distance from the stationary mount member 25 than the root portion, the pair of abutting members 30 can simultaneously abut the associated foil 26. Instead of varying the lengths of the pair of abutting members, it is also possible to vary the depths (or the levels of the cam surfaces) of the recesses 31 formed in the moveable member 27.

On the other hand, in a state shown in FIG. 3b, the moveable member 27 has been rotated with respect to the stationary mount member 25 and hence the foils 26 (counterclockwise in this drawing), so that the one end of each abutting member 30 contacts a deeper portion of the associate recess 31 of the moveable member 27. Therefore, the length of the other end portion of the abutting member 30 projecting out from the inner circumferential surface of the stationary mount member 25 toward the foil 26 is reduced (it is also possible to make no part of the abutting member 30 project out from the inner circumferential surface of the stationary mount member 25), so that the abutting members 30 do not abut the foils 26. Thus, in this state, each foil 26 can flex without being regulated by the abutting members 30, and the range of movement of the foils is increased compared with the state shown in FIG. 3a. This is practically equivalent to reducing the stiffness of the foils 26.

As described, according to the above embodiment of the present invention, because the abutting members 30 are provided so as to extend radially through the through-holes formed in the stationary mount member 25, and one end of each abutting member 30 is received in the associated one of the recesses 31 provided in the inner circumferential surface of the moveable member 27 where each recess 31 has a depth varying in the circumferential direction so that the bottom surface of each recess 31 functions as a cam surface, rotation of the moveable member 27 can change the length of the other end portion of each abutting member 30 projecting out from the inner circumferential surface of the stationary mount member 25. In this way, a radial position at which the abutting members 30 abut the circumferentially extending portions of the foils 26 when the foils 26 flex outwardly due to an externally applied force can be adjusted by varying the angular position of the moveable member 27, and this has substantially the same effect as varying the stiffness of the foils 26. Thus, by controlling the angular position of the moveable member 27 according to the rotational speed of the gas turbine engine, for example, it is possible to provide an appropriate stiffness (or range of movement) to the foils 26 to thereby achieve a preferable bearing property for a wide range spanning from low to high rotational speed regions. The abutting members 30 limit the flexing movement of the associated foils 26 by abutting the circumferentially extending portion thereof, and thus it is possible to prevent an excessive force from being concentrated on the root portion (bending portion) of the foils 26.

Figure 5A:
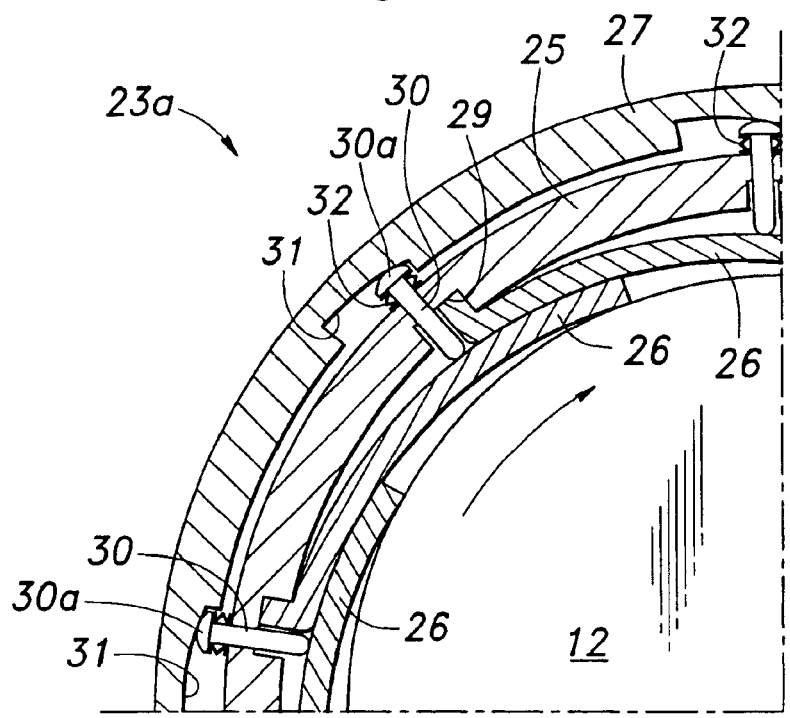
FIGS. 5a and 5b are enlarged cross sectional views and they each show another embodiment of a foil bearing according to the present invention in detail.
Figure 5B:
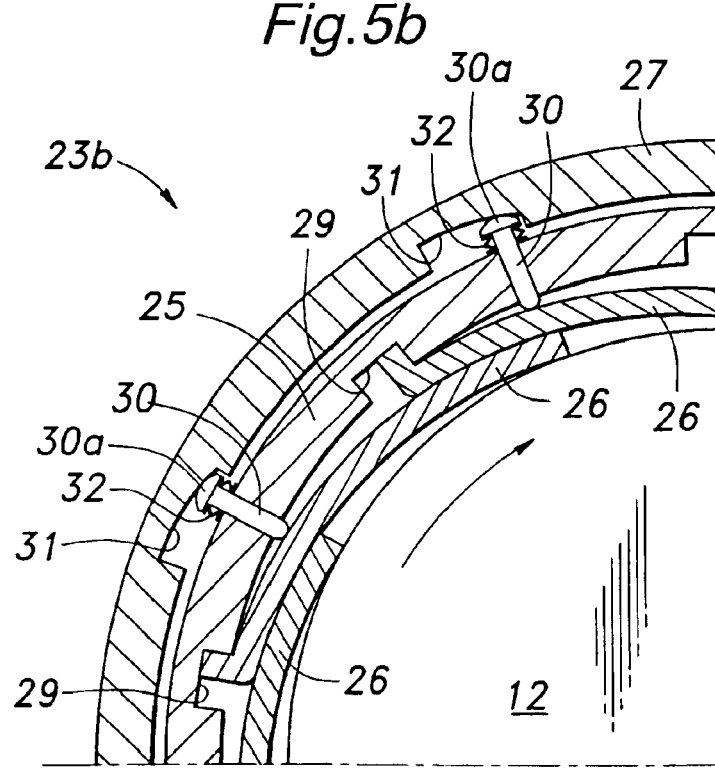

FIGS. 5a and 5b are enlarged partial views similar to FIGS. 3a and 3b and each of them shows another embodiment of a journal bearing embodying the present invention. In these drawings, component parts similar to those in FIGS. 3a and 3b are denoted with same reference numerals. In the embodiments shown in FIGS. 5a, 5b, each foil 26 is allotted with only one abutting member 30 in the circumferential direction.

In the journal bearing 23a shown in FIG. 5a, an abutting member 30 associated with one foil 26 extends through a recess 29 of the stationary mount member 25 that receives a root portion of a foil 26 adjacent to the associated foil 26, so that each abutting member 30 can abut a portion near the free end of the associated foil 26.

On the other hand, in the journal bearing 23b shown in FIG. 5b, each abutting member 30 can abut a portion of the associated foil 26 close to its root portion. Thus, the abutting members 30 can be provided at various positions according to the concrete characteristics, performances, etc. of individual foil bearings.

FIG. 6 is a cross sectional view similar to FIG. 2 and shows another embodiment of a journal bearing embodying the present invention. In this drawing, component parts similar to those in FIG. 2 are denoted with same reference numerals and detailed explanation thereof is omitted. This journal bearing 23c comprises a top foil (second foil) 33 having one end held by the stationary mount member 25 and extending in a circumferential direction to surround the approximately entire outer surface of the rotor shaft 12 and assume a substantially cylindrical shape. The foils (first foils) 26 attached to the stationary mount member 25 support the rotor shaft 12 via the top foil 33. In this embodiment, each of the foils 26 disposed in a gap between the stationary mount member 25 and the top foil 33 extends from its root portion in a direction opposite the direction of rotation of the rotor shaft 12. Further, adjacent foils 26 do not overlap each other. By providing the top foil 33, a frictional force is created between the top foil 33 and the foils 26, and the frictional force serves as Coulomb damping force that can contribute to improving rotational stability of the rotor shaft 12.

Figure 7A:
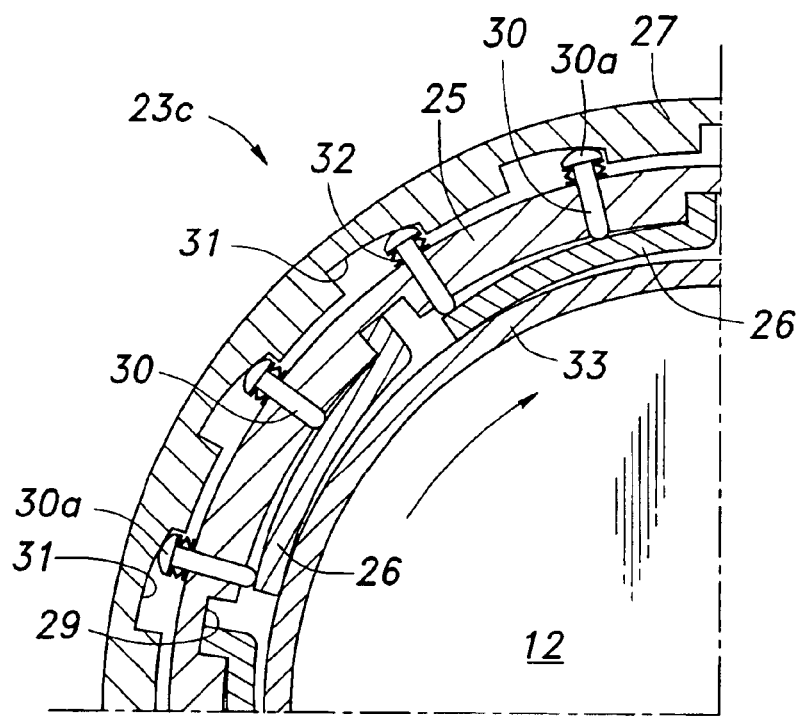
FIGS. 7a and 7b are enlarged cross sectional views for showing a detailed structure of the embodiment of the foil bearing shown in FIG. 6, in which a moveable member is shown at different angular positions.
Figure 7B:
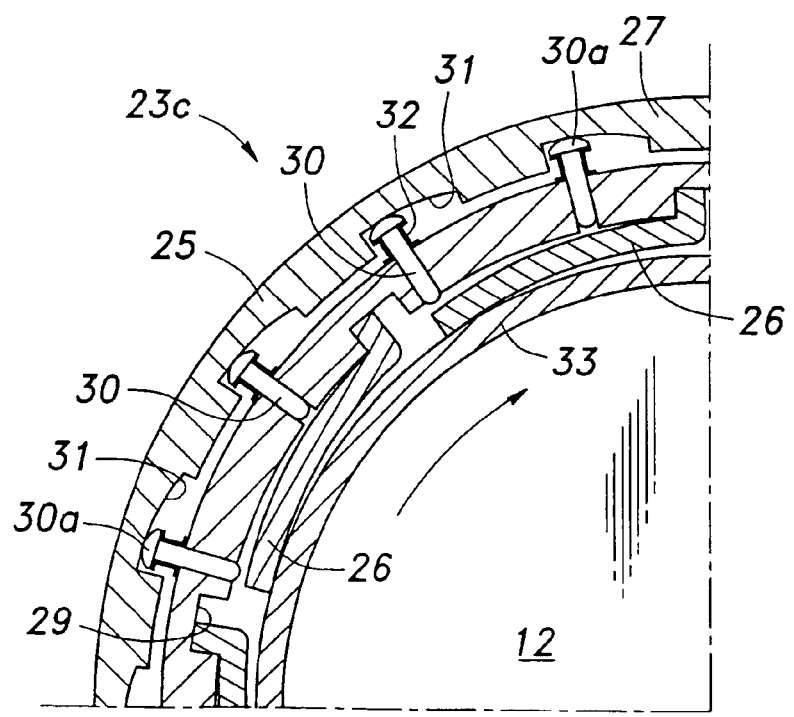

FIGS. 7a and 7b are enlarged partial cross sectional views for showing the journal bearing 23c of FIG. 6 more in detail. Similarly to the embodiments shown in FIGS. 3a, 3b and FIGS. 5a, 5b, a plurality of abutting members 30 extend in the radial direction through respective through-holes formed in the stationary mount member 25. One end of each abutting member 30 is received in an associated one of recesses 31 provided in an inner circumferential surface of the moveable member 27, and the other end of the same projects from an inner circumferential surface of the stationary mount member 25 to face a circumferentially extending portion of the associated foil 26. The one end of each abutting member 30 is formed with a flange 30a, and an annular compression spring 32 is disposed between the flange 30a and an outer circumferential surface of the stationary mount member 25. Each of the recesses 31 formed in the moveable member 27 has a depth that varies in the circumferential direction so that the bottom surface of the recess 31 serves as a cam surface contacting the one end of the abutting member 30. In this way, like the embodiments described above, in a state shown in FIG. 7a, the abutting members 30 abut the circumferentially extending portions of the foils 26 to thereby limit the outward flexing movement of the foils 26, while in a state of FIG. 7b, the retreated abutting members 30 do not abut the foils 26, which can accordingly flex without being regulated by the abutting members 30 and thus practically assume lower stiffness than in the state shown in FIG. 7a. Consequently, the expansion of the top foil 33 is more strictly limited in the state shown in FIG. 7a than in the state shown in FIG. 7b. Thus, it should be understood that the present invention can be applied to the embodiment using the top foil 33 to make the stiffness of the foils 26 and top foil 33 practically variable.

Figure 8:
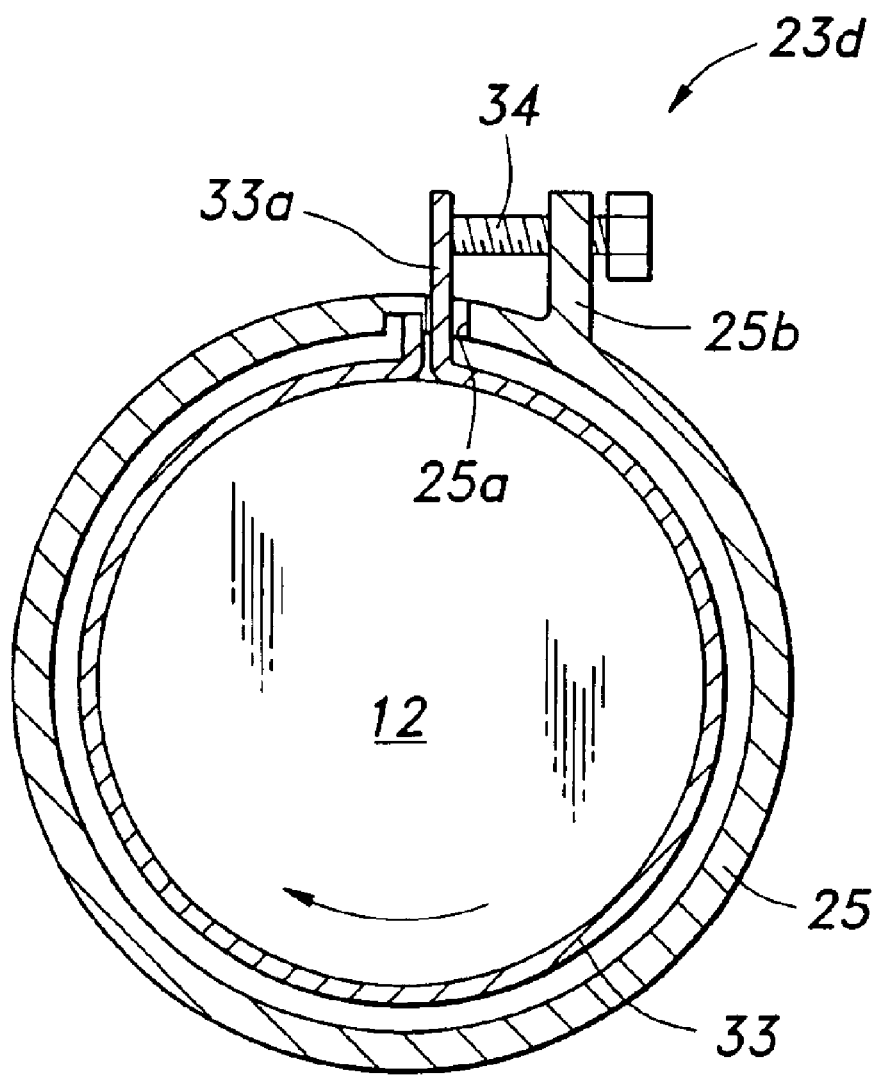
FIG. 8 is a cross sectional view similar to FIG. 2 and shows still another embodiment of a foil bearing to which the present invention is applied.

FIG. 8 is a cross sectional view similar to FIG. 2 and shows another embodiment of a journal bearing embodying the present invention. In this drawing also, component parts similar to those in FIG. 2 are denoted with same reference numerals and detailed explanation thereof is omitted. This journal bearing 23d also comprises the top foil 33 having one end held by the stationary mount member 25 and extending in a circumferential direction to surround the approximately entire outer surface of the rotor shaft 12 and assume a substantially cylindrical shape, but is not equipped with the foils 26 between the top foil 33 and the stationary mount member 25.

As seen in the drawing, the other end of the top foil 33 extends in the radial direction through a slot 25a provided in the stationary mount member 25 to form a radially extending portion 33a projecting out from the outer circumferential surface of the stationary mount member 25. The slot 25a extends in the circumferential direction so that the radially extending portion 33a of the top foil 33 can move in the circumferential direction within a range defined by the slot 25a. Different positions of the radially extending portion 33a can result in different diameter of the cylindrical portion of the top foil 33. A projection 25b extends from the outer circumferential surface of the stationary mount member 25 substantially in parallel with the radially extending portion 33a of the top foil 33. The projection 25b is formed with a threaded hole with which a bolt 34 serving as an abutting member engages. The bolt 34 extends toward the radially extending portion 33a of the top foil 33 and abuts a side thereof facing away from the one end of the top foil 33. In this way, by rotating the bolt 34 to cause the bolt 34 to advance toward or retreat from the radially extending portion 33a of the top foil 33, it is possible to change the range of movement of the radially extending portion 33a of the top foil 33 to whereby practically change the stiffness of the top foil 33. Thus, it should be understood that the present invention can be applied to the embodiment using only the top foil 33 to practically vary the stiffness of the top foil 33 according to the rotation speed of the rotor shaft, for example, and thereby achieve favorable bearing characteristics from low to high rotation speed regions.

Figure 9:
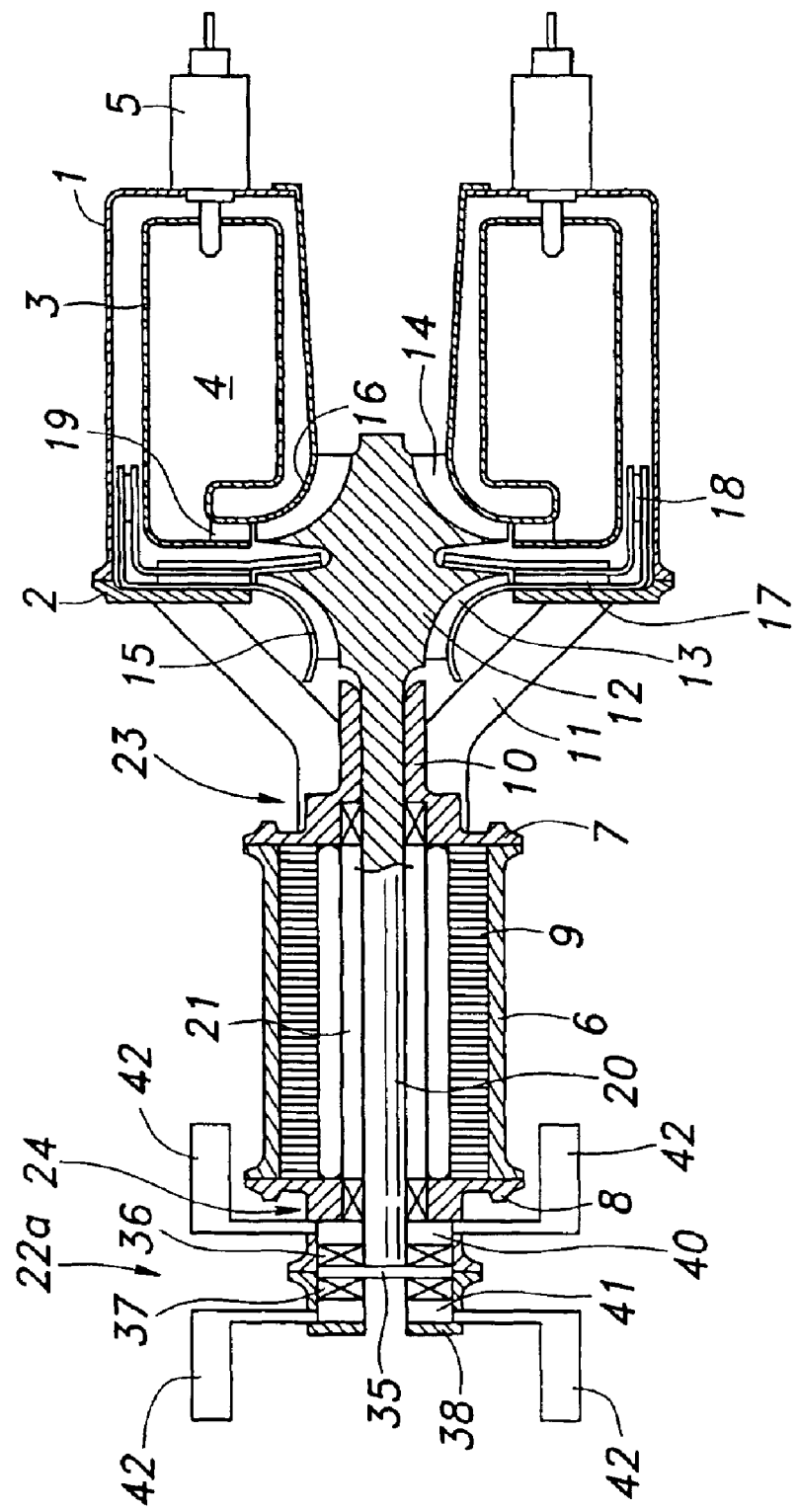
FIG. 9 is a longitudinal cross sectional view for showing an embodiment of a gas turbine generator in that the present invention is applied to a thrust bearing.

FIG. 9 is a cross sectional view similar to FIG. 1. The gas turbine generator of FIG. 9 differs from that of FIG. 1 in a sense that the present invention is applied to the thrust bearing in FIG. 9 instead of the journal bearings. As shown the drawing, this thrust bearing 22a comprises a disk-shaped portion 35 unitarily provided to an end of the rotor shaft 12, and a pair of stationary mount members 36, 37 axially interposing the disk-shaped portion 35 therebetween. In other words, the disk-shaped portion 35 serves as a rotating member in this embodiment. One stationary mount member 36 is secured to the end plate 8 while the other stationary mount member 37 is securely received in a cover 38 which in turn is secured to the end plate 8. Although not shown in FIG. 9, a plurality of foils 39 are arranged in a circumferential direction between the disk-shaped portion 35 and each of the stationary mount members 36, 37, so that the foils 39 abut planar surfaces (surfaces facing in the axial direction) of the disk-shaped portion 35 (see FIG. 10). Further, a pair of moveable members 40, 41 are disposed on either side of the stationary mount members 36, 37 opposite the disk-shaped portion 35 in such a manner that the moveable members 40, 41 can rotate about the rotation axis of the rotor shaft 12 (and hence of the disk-shaped portion 35). Operation bars 42 are provided on outer cylindrical surfaces of the moveable members 40, 41 and extend radially through slots formed in the end plate 8 and cover 38. The operation bars 42 are controlled by an appropriate controller not shown, whereby the angular position of the moveable members 40, 41 can be varied according to the rotational speed of the gas turbine engine, for example.

Figure 10:
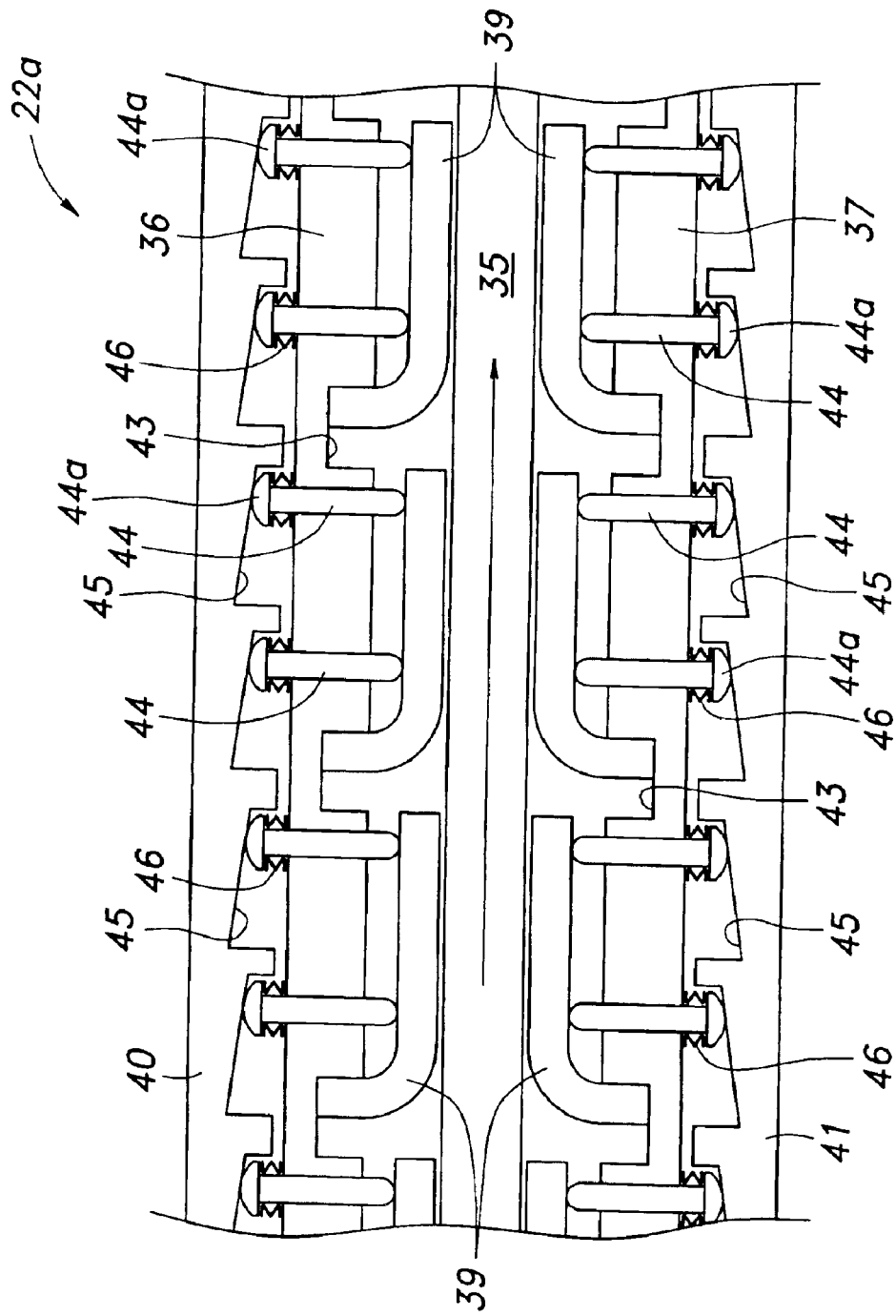
FIG. 10 is a partial schematic view showing the thrust bearing in FIG. 9 along a circumferential direction.

FIG. 10 is a partial schematic view for showing the thrust bearing 22a more in detail and shows a part of the thrust bearing 22a along the circumferential direction. As shown, the plurality of foils 39 are disposed on a side of each stationary mount members 36, 37 facing the disk-shaped portion 35 to constitute a foil bearing. Each foil 39 is made of a flexible material, and one end thereof is fixedly received in an associated one of recesses 43 formed in the stationary mount members 36, 37. Each foil 39 is bent near the root end (or fixed end) thereof and its main portion extends substantially circumferentially in a direction of rotation of the disk-shaped portion 35 as indicated by an arrow in the drawing. In this embodiment, adjacent foils 39 do not overlap each other and are spaced from each other in the circumferential direction. As the rotor shaft 12 rotates together with the disk-shaped portion 35, a fluid such as ambient air is drawn in between the foils 39 and the disk-shaped portion 35 to form fluid films between the foils 39 and the opposing surfaces (planar surfaces) of the disk-shaped portion 35, which enables the disk-shaped portion 35 to rotate with low friction.

In this embodiment, according to the present invention, a plurality of abutting members 44 extend in the axial direction through associated through-holes formed in the stationary mount members 36, 37. One end of each abutting member 44 is received in associated one of recesses 45 formed in inner surfaces of the moveable members 40, 41, and the other end thereof projects from inner surfaces of the stationary mount members 36, 37 to face a circumferentially extending portion of the associated foil 39. The one end of each abutting member 44 is formed with a flange 44a, and an annular compression spring 46 is disposed between the flange 44a and an outer surface of either of the stationary mount members 36, 37. Each of the recesses 45 formed in the moveable members 40, 41 has a depth that varies in the circumferential direction so that the bottom surface of the recess 45 serves as a cam surface contacting the one end of the abutting member 44. It should be noted that although each foil 39 is allotted with two abutting members spaced in the circumferential direction in this embodiment, only one or more than two abutting members 44 may be used for each of the foils 39.

In a state shown in FIG. 10, the one end of each abutting member 44 contacts a shallow portion of the corresponding recess 45 formed in the moveable members 40, 41, and accordingly the other end thereof projects out from the inner surface of the stationary mount members 36, 37 to abut circumferentially extending portion of the associated foil 39. Though not shown in the drawings, in a manner similar to that described above regarding the preceding embodiments, it is possible to cause the one end of each abutting member 44 to contact a deeper portion of the bottom of the associated recess 45 formed in the moveable members 40, 41 by rotating the moveable members 40, 41 so as to change the length of the other end portion of each abutting member 44 projecting out from the inner surface of the stationary mount members 36, 37. Thus, by controlling the angular position of the moveable members 40, 41 according to the rotational speed of the disk-shaped portion 35 (and hence the rotor shaft 12), for example, it is possible to adjust the moveable range of the foils 39 regulated by the abutting members 44, practically changing the stiffness of the foils 39 to achieve a preferable bearing property in both low and high rotational speed regions. Each abutting member 44 abuts the circumferentially extending portion of the associated foil 39, and thus it is possible to prevent an excessive force from being concentrated on the root portion of the foils 39. As described above, the present invention can be preferably applied to thrust bearings. It should be noted that although in this embodiment a foil bearing is constituted on each side of the disk-shaped portion 35, it may be possible to provide a foil bearing only on one side of the disk-shaped portion 35 when it is known that an axial force is imparted on the disk-shaped portion 35 in only one direction.

Figure 11:
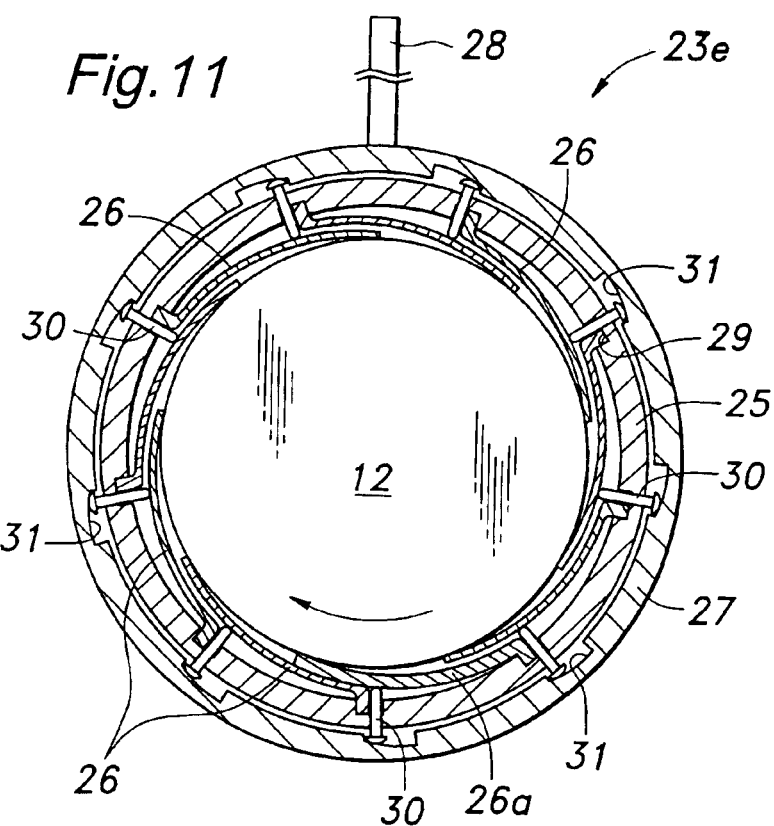
FIG. 11 is a cross sectional view similar to FIG. 2 and shows still another embodiment of a foil bearing to which the present invention is applied.
Figure 12:
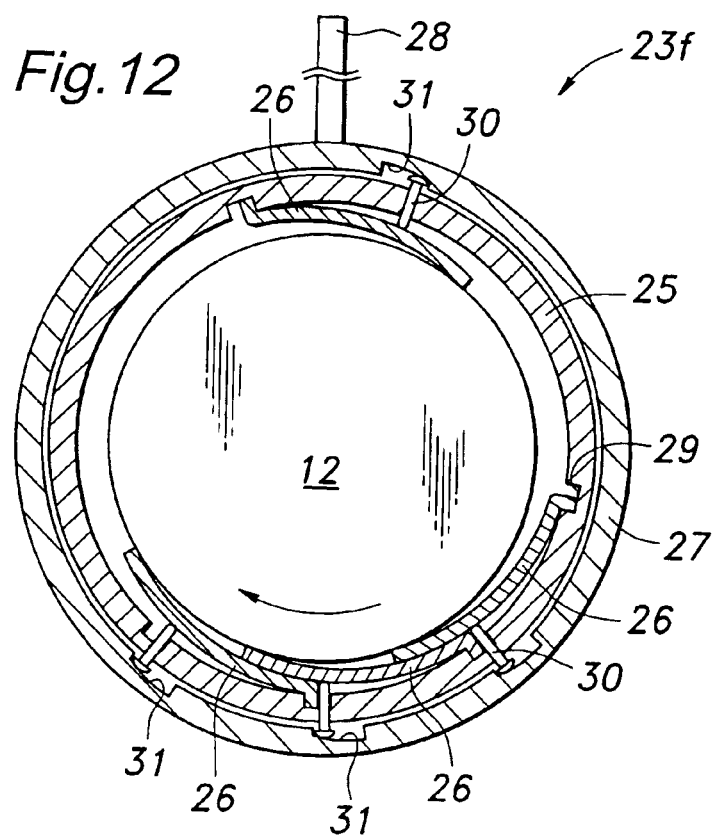
FIG. 12 is a cross sectional view similar to FIG. 2 and shows still another embodiment of a foil bearing to which the present invention is applied.

FIGS. 11 and 12 are cross sectional views similar to FIG. 2 and they each show yet another embodiment of the present invention. In these drawings, component parts similar to those in FIG. 2 are denoted with same reference numerals and detailed explanation thereof is omitted. In the journal bearing 23e of FIG. 11, a lowermost foil 26a is provided with a larger thickness than the other foils 26 and accordingly has a larger stiffness. This is because the lowermost foil 26a must support a larger load due to the gravity, and the larger stiffness of the lowermost foil 26a can compensate the effect of the gravity to thereby prevent an undesirable shift of the rotational axis of the rotor shaft 12. For a similar purpose, in the journal bearing 23f shown in FIG. 12, spaces between adjacent foils 26 are varied. Specifically, the foils 26 are disposed relatively closely (three foils in the drawing) on a lower side of the rotor shaft 12, and sparsely on an upper side of the same (only one foil in the drawing). In these embodiments also, the abutting members 30 for abutting the circumferentially extending portions of the foils 26 are preferably provided so that the range of movement of the foils 26 can be adjusted by varying the abutment position depending on the rotational position of the moveable member 27.

Although the present invention has been described in terms of preferred embodiments thereof, it is obvious to a person skilled in the art that various alterations and modifications are possible without departing from the scope of the present invention which is set forth in the appended claims.

For instance, the number of abutting members for an individual foil may be varied depending on the position of the foils. Thus, the foils on the upper side of the rotor shaft may each be allotted with one abutting member while the foils on the lower side of the rotor shaft may each be allotted with a pair of abutting members, for example.

As described above, according to the present invention, because the abutting member is provided so as to extend from the moveable member toward the circumferentially extending portion of the foil through the through-hole formed in the stationary mount member and the surface of the moveable member contacting one end of the abutting member is provided with a cam surface, rotation of the moveable member can vary the length of the other end portion of the abutting member projecting out from the surface of the stationary mount member. Therefore, by varying the angular position of the moveable member, it is possible to adjust the position at which the abutting member abuts the circumferentially extending portion of the foil when an externally applied force causes the foil to flex outwardly. This has substantially the same effect as varying the stiffness of the foil. In a case where the present invention is applied to a journal bearing and/or thrust bearing of a gas turbine engine, for example, the angular position of the moveable member may be controlled according to the rotational speed of the gas turbine engine so that an appropriate stiffness (or range of movement) is provided to the foil and a favorable bearing property is achieved for a wide range from low to high rotational speed regions. The abutting member limits the flexing movement of the associated foil by abutting the circumferentially extending portion thereof, and thus it is possible to prevent an excessive force from being concentrated on the root portion of the foil.

What is claimed is:

1. A foil bearing for supporting a rotating member that rotates about an axis, comprising:

a stationary mount member spaced from the rotating member so that a gap is defined between the stationary mount member and the rotating member, the stationary mount member having a first surface facing the rotating member and a second surface opposite to the first surface;

a moveable member disposed on a side of the stationary mount member opposite to the rotating member so as to be rotatable about the axis, the moveable member having a first surface facing the second surface of the stationary mount member;

a first foil disposed in the gap between the rotating member and the stationary mount member to support the rotating member via a fluid film when the rotating member rotates, the first foil having a portion extending in a substantially circumferential direction; and an abutting member extending from the moveable member toward the first foil through a through-hole formed in the stationary mount member, the abutting member having one end in contact with the first surface of the moveable member and other end facing the circumferentially extending portion of the first foil, wherein a cam surface is formed on a part of the first surface of the moveable member with which the one end of the abutting member is in contact so that rotation of the moveable member around the axis can vary a length of the other end portion of the abutting member projecting out from the first surface of the stationary mount member toward the circumferentially extending portion of the first foil.

2. A foil bearing according to claim 1, comprising a plurality of the first foils arranged in the circumferential direction of the rotating member, and at least one of the plurality of first foils is allotted with the abutting member.

3. A foil bearing according to claim 2, each of the plurality of first foils is allotted with the abutting member.

4. A foil bearing according to claim 1, comprising a plurality of the abutting members having varying lengths.

5. A foil bearing according to claim 1, comprising a plurality of the abutting members wherein a plurality of the cam surfaces are provided on the first surface of the moveable member corresponding to the plurality of abutting members, the plurality of first cam surfaces having varying levels.

6. A foil bearing according to claim 2, wherein spaces between adjacent ones of the plurality of first foils are varied.

7. A foil bearing according to claim 1, wherein the rotating member comprises a shaft having a substantially cylindrical portion, and the stationary mount member surrounds the shaft so that the gap is formed as an annular gap defined between a cylindrical surface of the cylindrical portion of the shaft and the stationary mount member.

8. A foil bearing according to claim 7, wherein the shaft consists of a rotor shaft of a gas turbine engine, and the foil bearing constitutes a journal bearing for the rotor shaft of the gas turbine engine.

9. A foil bearing according to claim 7, comprising a plurality of the first foils arranged in the circumferential direction of the shaft, and the foil bearing further comprises a second foil disposed between the shaft and the plurality of first foils and extending in the circumferential direction to have a substantially cylindrical shape.

10. A foil bearing according to claim 1, wherein the rotating member comprises a disk-shaped member and the gap is defined between the stationary mount member and a planar surface of the disk-shaped member.

11. A foil bearing according to claim 10, wherein the disk-shaped member is provided as a unitary portion of a rotor shaft of a gas turbine engine, and the foil bearing constitutes a thrust bearing of the rotor shaft of the gas turbine engine.

12. A foil bearing for supporting a rotating member that rotates about an axis, comprising:

a stationary mount member surrounding the rotating member so that a gap is defined between the stationary mount member and the rotating member, the stationary mount member having an inner circumferential surface facing the rotating member and an outer circumferential surface opposite to the inner circumferential surface; and a top foil disposed in the gap between the rotating member and the stationary mount member to support the rotating member via a fluid film when the rotating member rotates, the top foil consisting of a member extending in a circumferential direction to have a substantially cylindrical shape, wherein one end of the top foil is secured to the stationary mount member while the other end of the top foil extends in a radial direction through a slot formed in the stationary mount member at a position near the one end of the top foil to project out from the outer circumferential surface of the stationary mount member, and wherein the foil bearing further comprises an abutting member which is moveably attached to the stationary member so as to abut a side of the radially extending portion of the other end of the top foil facing away from the one end of the top foil whereby stiffness of the top foil can be practically adjusted by varying a position at which the abutting member abuts the radially extending portion of the top foil.

* * * * *